United States Patent [19]
Lacey et al.

[11] Patent Number: 5,676,878
[45] Date of Patent: Oct. 14, 1997

[54] LIQUID CRYSTAL POLYMERS

[75] Inventors: David Lacey; Alan W. Hall, both of Hull; Jonathan S. Hill, Manchester; Damien G. McDonnell, Malvern, all of Great Britain

[73] Assignees: The Secretary of State for Defence in Her Britannic Majesty's Government of the United Kingdom of Great Britain and Northern Ireland; Evaluation Research Agency, DRA, both of United Kingdom

[21] Appl. No.: 530,119

[22] PCT Filed: Mar. 30, 1994

[86] PCT No.: PCT/GB94/00662

§ 371 Date: Oct. 30, 1995

§ 102(e) Date: Oct. 30, 1995

[87] PCT Pub. No.: WO94/22977

PCT Pub. Date: Oct. 13, 1994

[30] Foreign Application Priority Data

Apr. 6, 1993 [GB] United Kingdom ............ 9307213

[51] Int. Cl.$^6$ ............ C09K 19/52; G02F 1/13; C08F 20/00; C08F 222/00
[52] U.S. Cl. ............ 252/299.01; 252/299.61; 252/299.63; 252/299.64; 252/299.65; 349/2; 349/183; 349/187; 525/329.5; 526/72; 526/291; 526/318; 428/1
[58] Field of Search ............ 252/299.01, 299.61, 252/299.63, 299.64, 299.65, 299.66; 349/2, 183, 187; 526/72, 291, 318; 525/329.5; 428/1

[56] References Cited

U.S. PATENT DOCUMENTS 4,983,429   1/1991   Takayanagi et al. ............ 428/1

FOREIGN PATENT DOCUMENTS 447313   9/1991   European Pat. Off. .
2146787  4/1985   United Kingdom .

OTHER PUBLICATIONS

Shibaev et al. "Themotropic Liquid–Crystalline Polymers: 14. Themo–recording on Liquid–Crystalline Polymers with the Aid of a Laser Beam", Polymer Communications, vol. 24, No. 12, pp. 364–365, 1983.

*Primary Examiner*—Shean C. Wu
*Attorney, Agent, or Firm*—Nixon & Vanderhye

[57] ABSTRACT

A liquid crystal polymer or copolymer is disclosed of structure (A) where X=CN, COR, $CO_2R$, CHO, $CF_3$; R=branched chain, straight chain or chiral alkyl; ▭=any suitable mesogenic group; Z=single covalent bond, oxygen, sulfur, $CO_2$ or OCO; n=1 to 20; Y=H, OH, F, $OCH_3$; m=3 to 200; P=a single covalent bond, oxygen, or OCO.

24 Claims, 2 Drawing Sheets

LIQUID CRYSTAL POLYMERS

This is a 35 U.S.C. § 371 national phase application of PCT/GB94/00662 filed Mar. 30, 1994.

This invention concerns novel liquid crystal polymer (LCP) materials, novel intermediates and method for preparing same.

BACKGROUND OF THE INVENTION

LCP's are known and are used in the electro-optical device industry, for example, in optical storage devices, in non-linear optical devices and in pyroelectric devices, see for example, GB 2146787 A and Makromol Chem, 186 2639–2647, 1985.

One known type of LCP consists of a polymeric backbone to which are attached laterally pendant side chains which have a chemical structure that is mesogenic, ie. that induces liquid crystalline character, these being known as side chain liquid crystal polymers. Work in this field has identified a large number of side chain structures which are suitable, see for example GB 2146787 A. For some purposes it is desirable that the LCP shows a smectic C ($S_c$) or chiral smectic C ($S_c^*$) liquid crystal phase, and a particularly preferred side chain for achieving this is one which contains a laterally fluorinated biphenyl or terphenyl system.

Side chain liquid crystal polyacrylates and polymethacrylates are known, Polymer Communications, 24 364–365, 1988; Liquid Crystals 12(2) 305–318, 1992, having a polyacrylate or polymethacrylate backbone, with dependent mesogenic side chains, ie. of general structure:

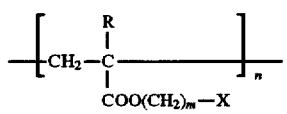

Where $(CH_2)_m$ is the spacer group, X is the mesogenic side chain and R is hydrogen in the case of polyalkylacrylates, being methyl in polymethacrylates.

SUMMARY OF THE INVENTION

Figure 1:
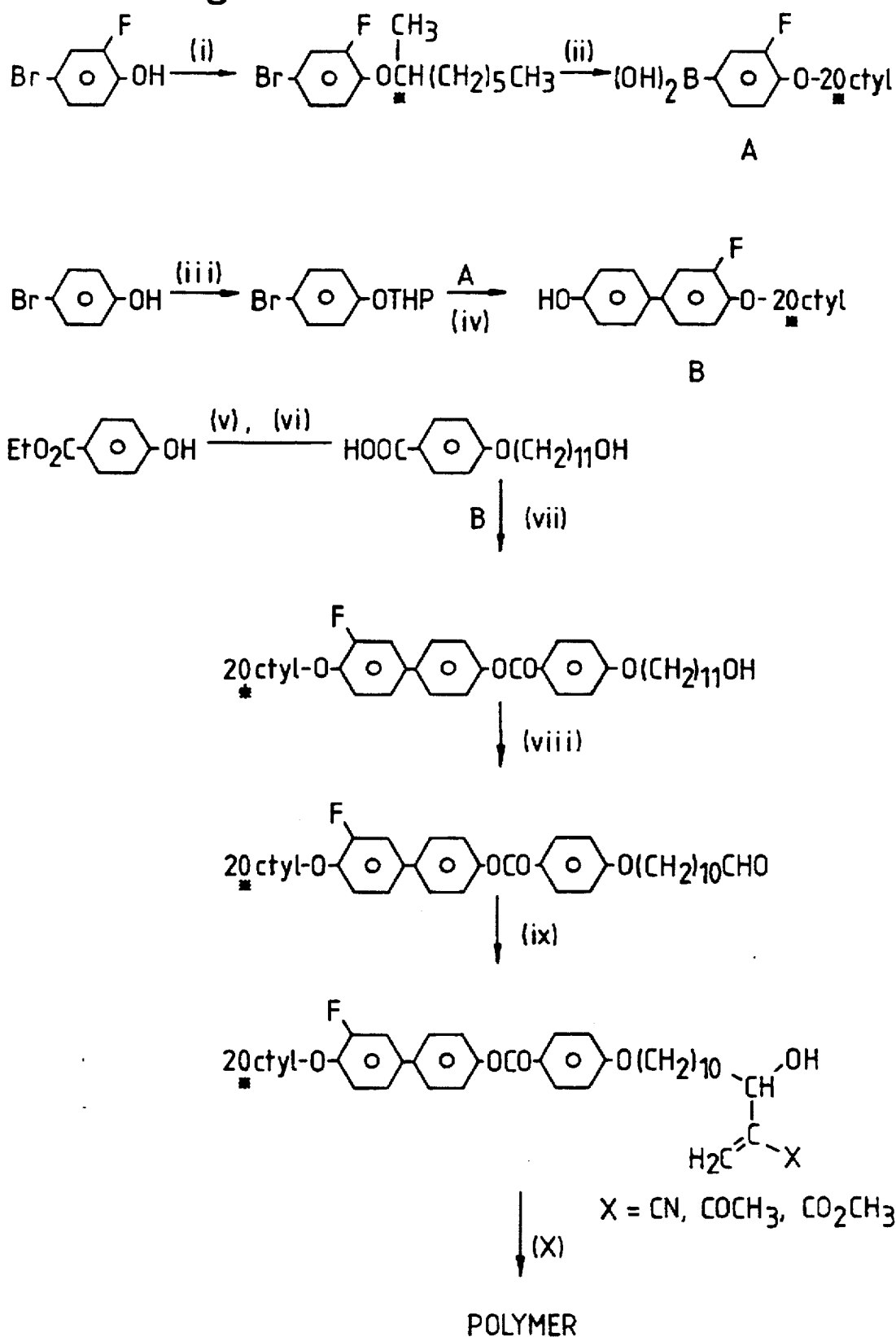
FIG. 1 is a synthetic scheme for the preparation of liquid crystal polymers.

According to the present invention there is provided a novel LCP material having improved liquid crystal properties over known LCP materials and which my comprise the same or different monomer units, ie. may comprise polymers or copolymers, and having a general structure (A):

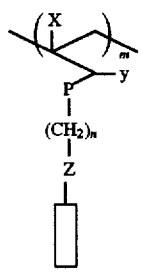

(A)

wherein

X=CN, COR, CO$_2$R, CHO, CF$_3$;

R=branched chain, straight chain or chiral alkyl;

☐=any suitable mesogenic group;

Z=single covalent bond, oxygen, sulphur, CO$_2$ or OCO;

n=1 to 20; preferably n=2 to 12 and more preferably n=5 to 12;

Y=H, OH, F, OCH$_3$;

m=3 to 200; preferably m=3 to 100;

P=a single covalent bond, oxygen, or OCO.

The mesogenic group my be defined from structure (B);

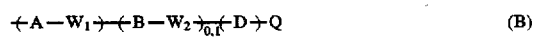

(B)

wherein A, B and D are independently selected from:

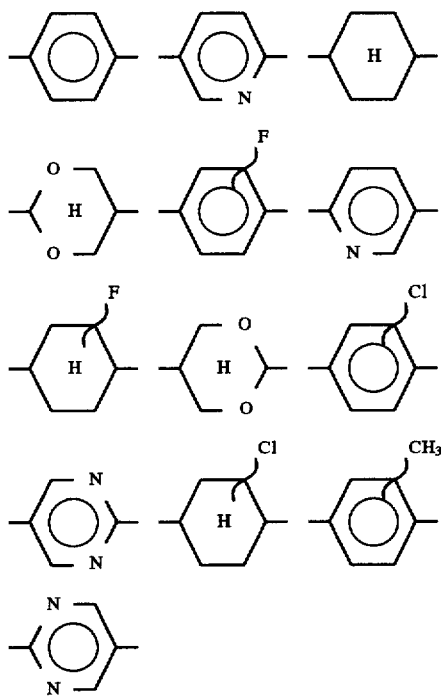

$W_1$ and $W_2$ are independently selected from: a single covalent bond, COO, OCO, CH$_2$CH$_2$, CH$_2$O, OCH$_2$, O;

Q is selected from: CN, halogen, R, OR, COOR, CF$_3$, lactate derivatives, where R=chiral, straight or branched chain alkyl and includes where one or more CH$_2$ groups can be substituted by CH(CN), CH(CF$_3$), CH(Cl), CH(CH$_3$), where if more than one CH$_2$ group is substituted then such substitution is not carried out on neighbouring CH$_2$ groups.

The copolymer my be random, block or any other variation as is known in the art.

Preferably Y may be OH and the OH groups used as a point of attachment for cross-linking agents to form elastomers, examples of such cross-linkage agents include,

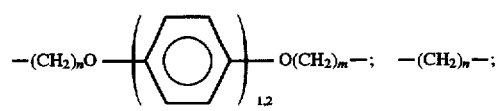

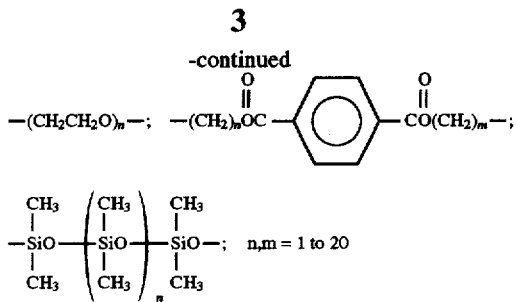

According to another aspect of the present invention there are provided intermediate compounds, or monomer units, which, although not themselves liquid crystalline, polymerise to form LCP materials according to the present invention.

According to a further aspect of the present invention there is provided a method of producing the intermediate compounds. The method may comprise the use of the Bayliss-Hillman reaction (illustrated in Scheme 1(b)), which has not hitherto been used in liquid crystal chemistry.

The method may also comprise reactions, other than the Bayliss-Hillman reaction, to produce the intermediate compounds, as would more readily occur to one skilled in the art.

The liquid crystal polymer or copolymer may comprise intermediate compounds, or monomers, of general structure (C):

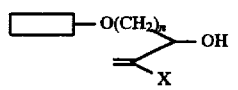

wherein

X=CN, COR, CO$_2$R, CHO, CF$_3$;

R=branched chain, straight chain or chiral alkyl and n may be 1 to 20.

The monomer unit my comprise any ore of the following examples 1.3a to 1.3m.

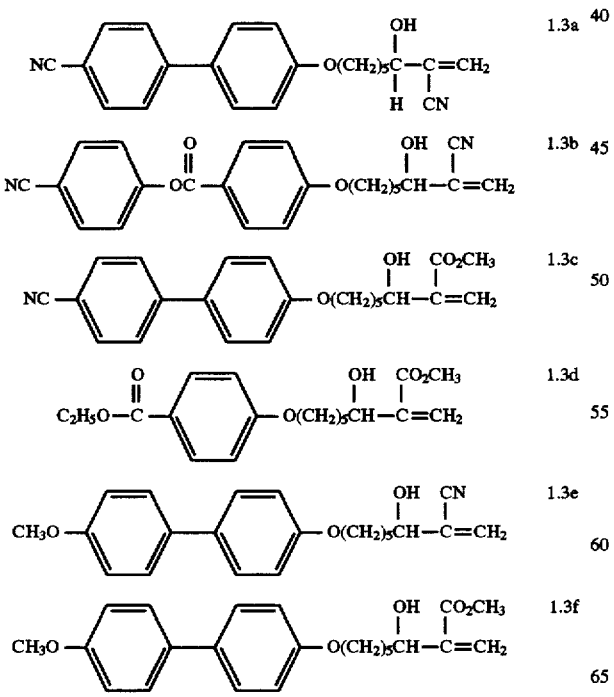

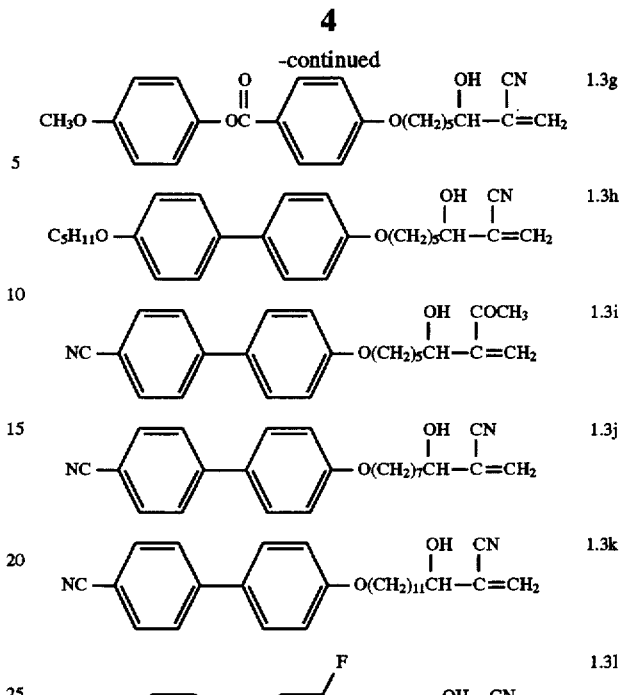

The monomer units may be used to synthesise polymers or copolymers of general structure (D):

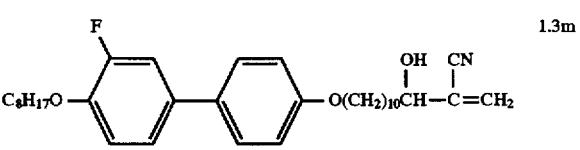

wherein

X=CN, COR, CO$_2$R, CHO, CF$_3$;

R=branched chain, straight chain or chiral alkyl;

▢=any suitable mesogenic group;

n=1 to 20;

m=3 to 200;

The liquid crystal polymer or copolymer may comprise

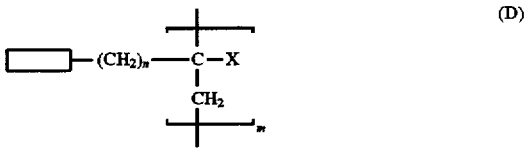

m = 3 to 200

The liquid crystal polymer or copolymer my comprise the general structure (E):

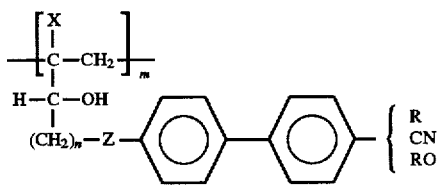

wherein

X=CN, COR, CO$_2$R, CHO, CF$_3$;

R=branched chain, straight chain or chiral alkyl;

Z=single covalent bond, oxygen, sulphur, CO$_2$ or OCO;

n=1 to 20;

m=3 to 200;

For example, the liquid crystal polymer or copolymer may comprise

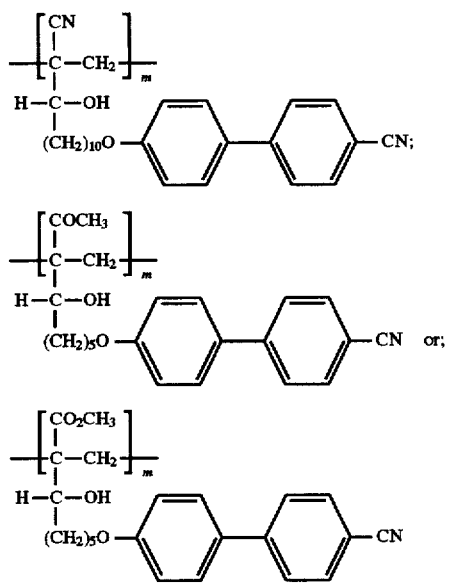

The liquid crystal polymer or copolymer may comprise monomers of general structure (F):

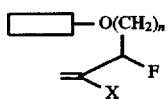

wherein

X=CN, COR, CO$_2$R, CHO, CF$_3$;

R=branched chain, straight chain or chiral alkyl;

☐=any suitable mesogenic group;

n=1 to 20;

For example, the liquid crystal polymer or copolymer may comprise:

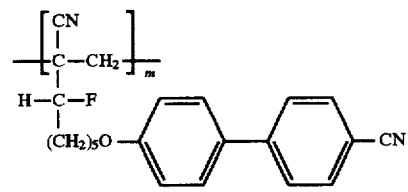

or;

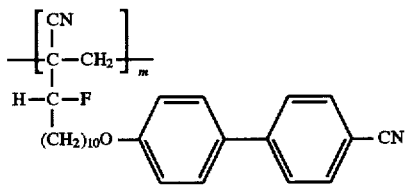

m = 3 to 200

The liquid crystal polymer or copolymer may comprise monomers of general structure (G):

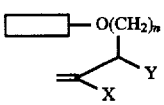

wherein

X=CN, COR, CO$_2$R, CHO, CF$_3$;

R=branched chain, straight chain or chiral alkyl;

☐=any suitable mesogenic group;

Y=H, OH, F, OCH$_3$;

n=1 to 20;

The LCP material according to the invention may be used in any of the known types of electro-optic device, for example in large area high resolution displays, piezo- and pyro-electric sensors and as components for optical sensing. A device incorporating such a material is another aspect of the invention.

DESCRIPTION OF THE PREFERRED EMBODIMENTS

SCHEME 1

Preparation of Compounds of Structure (1.1)

An example of this procedure is the synthesis of 6-(4-cyano-4'-oxybiphenyl)hexanol (1.1a).

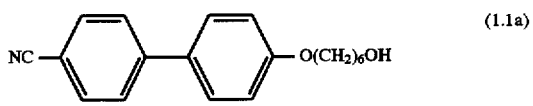

A mixture of 4-cyano-4'-hydroxybiphenyl (0.102 mol), 1-chloro-6-hydroxyhexane (0.122 mol) and potassium carbonate (0.130 mol) in molecular sieve-dried dimethylformamide (30 ml) was refluxed for 24 h. The mixture was poured into water (2 L) and cooled to 4° C. The resultant precipitated crystalline solid was removed by filtration and recrystallised from aqueous acetone to give white crystals (yield=92%).

m/z 295 (M$^+$), 195. $\upsilon_{max}$ (KCl disc) 3550–3000, 2950, 2880, 2230, 1605 1495, 1475, 1400, 1295, 1270, 1250, 1185 cm$^{-1}$. $^1$HNMR (CDCl$_3$) δ 1.35–1.65 and 1.80–1.90 (m, 9H), 3.65 (t, 2H), 4.0 (t, 2H), 6.95–7.70 (m, 8H). K 93 N 110° C. I.

A similar methodology was employed to synthesise the following compounds.

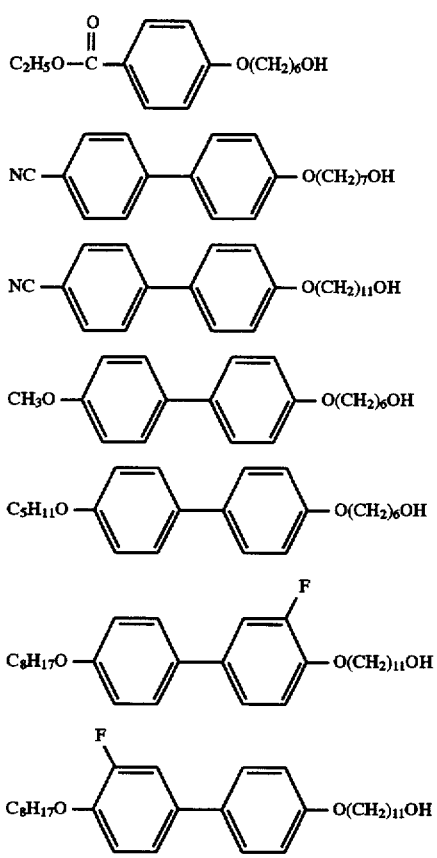

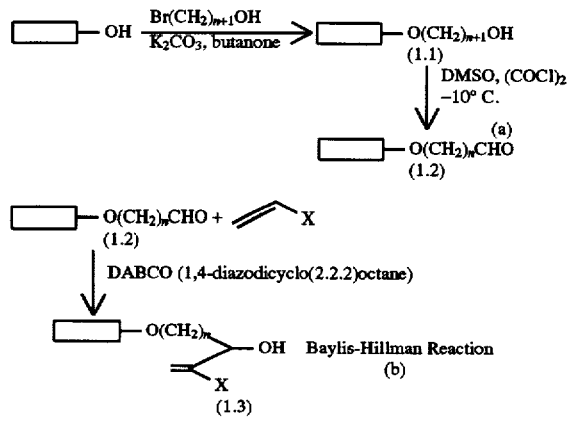

X = CN, COCH₃ and CO₂CH₃.

Preparation of Compounds of Structure (1.2)

This procedure (Ref 1) is exemplified by the synthesis of 6-(4-cyano-4'-oxybiphenyl)hexanal (1.2a)

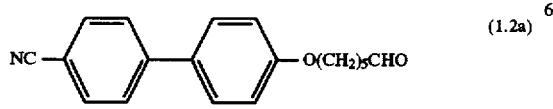

Dimethylsulphoxide (0.085 mol) dissolved in dichloromethane (18 ml) was added dropwise to oxalyl chloride (0.038 mol) dissolved in dichloromethane (80 ml) and cooled to −30° C. A solution of 6-(4-cyano-4'-oxybiphenyl) hexanol (1.1a) (0.034 mol) was added dropwise over −10 min and the reaction mixture allowed to rise to −5° C. When the reaction was complete (t.l.c. monitoring), the reaction mixture was cooled to −30° C. and triethylamine (0.20 mol) added dropwise. The mixture was allowed to rise to room temperature and water (60 ml) was added. The organic phase was separated. The aqueous phase was re-extracted with dichloromethane (50 ml), and combined dichloromethane extracts plus the organic phase were washed with saturated brine (100 ml), 1% v/v hydrochloric acid (100 ml), water (100 ml), aqueous sodium carbonate (5%) (100 ml), water 2×100 ml) and then finally dried over magnesium sulfate. Removal of solvent in vacuo left a clear oil which was mixed with a solution of sodium metabisulphite (10 g) in water (25 ml) and ethanol (5 ml), and shaken to form a bisulphite addition compound. This was removed by filtration, washed with ethanol (2×100 ml) and then placed in saturated sodium carbonate solution (100 ml) and stirred for 45 min. Extraction with diethyl ether (3×100 ml) followed by drying over magnesium sulphate and removal of solvent in vacuo left a white waxy solid of one-spot purity by t.l.c.

Yield=78%. $v_{max}$ (KCl disc) 2950, 2870, 2230, 1725, 1605, 1495, 1290, 1250, 1180, 825 cm$^{-1}$ m/z 293 (M$^+$), 195. $^1$HNMR (CDCl$_3$) δ 1.50 (quin, 2H), 1.70 (quin, 2H), 1.90 (quin, 2H), 2.50 (t, 2H), 3.95 (t, 2H), 6.95–7.70 (m, 8H), 9.80 (s, 1H). K 78.5 (N 74.0)°C. I.

A similar procedure was used to synthesize the following compounds

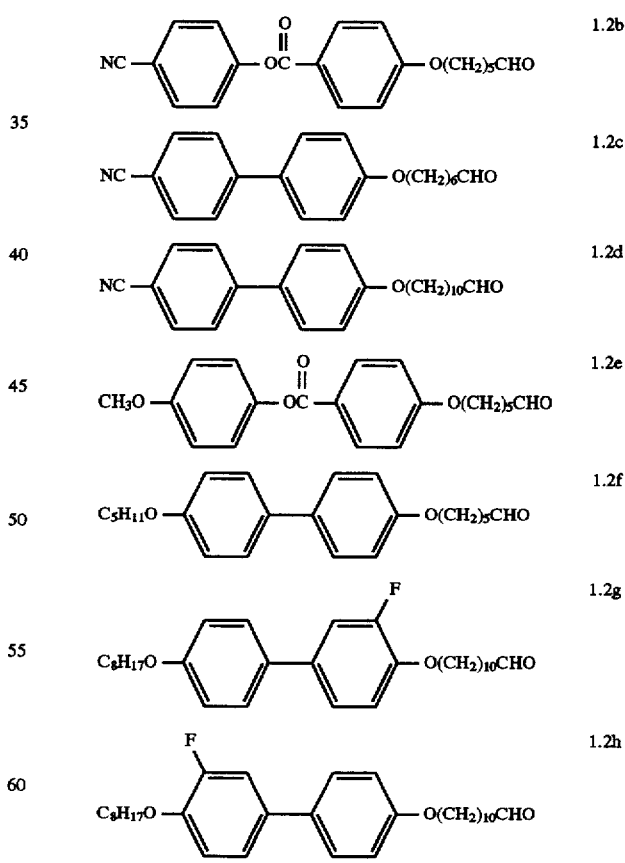

Preparation of Adducts (1.3)

This procedure (Ref 2) is exemplified by the synthesis of 2-cyano-3-hydroxy-8-(4-cyano-4'-oxybiphenyl)oct-1-ene (1.3a).

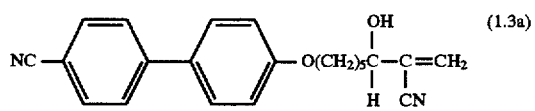

A mixture of 6-(4-cyano-4'-oxybiphenyl)hexanal (1.2a) (0.0034 mol), acrylonitrile (0.0136 mol), 3-quinuclidinol (0.0011 mol) was stirred at room temperature for 48 h. Excess acrylonitrile was removed in vacuo and the resultant oily solid was dissolved in dichloromethane (50 ml) then washed with 2N hydrochloric acid (50 ml), water (2×100 ml), and finally dried over magnesium sulphate. Removal of solvent left a clear oil which solidified on cooling. Column chromatography using silica gel and (1) dichloromethane followed by (2) diethyl ether as eluents gave a white, waxy solid of one-spot purity by t.l.c.

Yield=80%. m/z 346 (M$^+$), 328, 195. $\upsilon_{max}$ (KCl disc) 3600–3200, 2970, 2830, 2230, 1670, 1600, 1495, 1470, 1290, 1255, 1185 cm$^{-1}$. $^1$HNMR (CDCl$_3$) δ 1.30–1.85 (m, 8H), 1.95 (d, 1H), 3.95 (t, 2H), 4.20 (q, 2H), 5.90 (s, 1H) 6.0 (s, 1H), 6.90 (d, 2H), 7.45 (d, 2E), 7.60 (q, 4H). K 47.5° C. I.

A similar procedure was used to synthesis the following compounds.

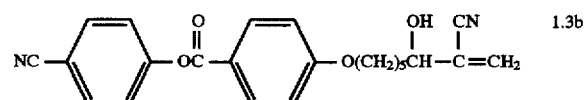
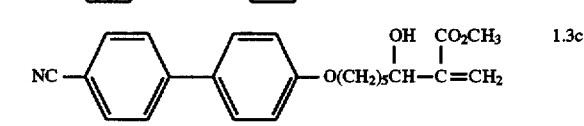
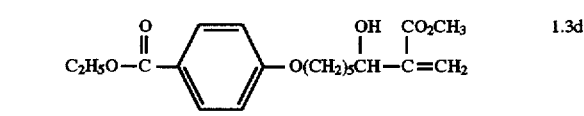
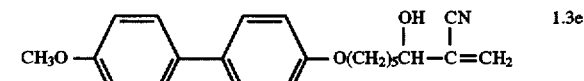
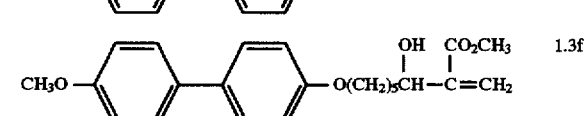
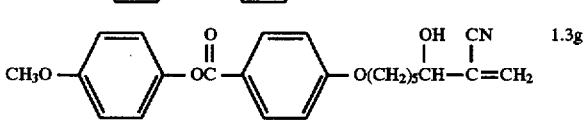
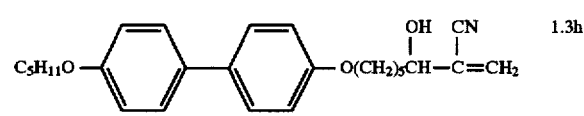
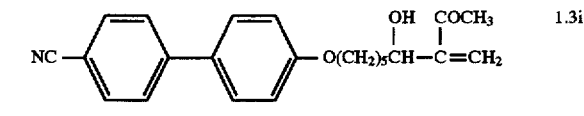
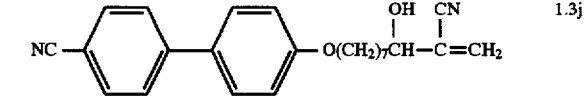

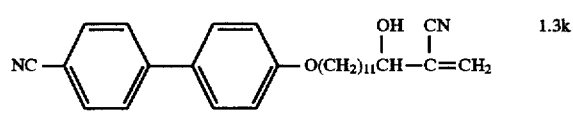
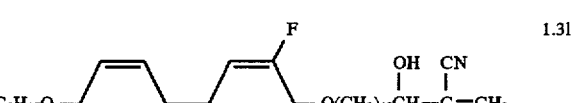
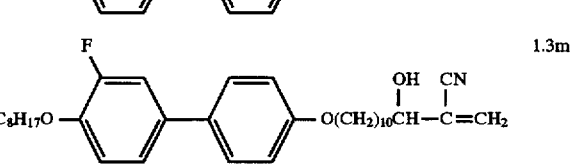

SCHEME 2

Preparation of Polymers (2.3)

Preparation of Compounds of Structure (2.1)

This procedure is exemplified by the synthesis of 1-bromo-2-cyano-8-(4-cyano-4'-oxybiphenyl)oct-2-ene (2.1a).

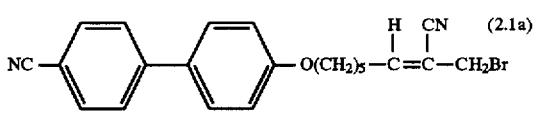

Dimethyl sulphide (0.0104 mol) in dry dichloromethane (10 ml) was added dropwise to a solution of N-Bromosuccinimide (0.0095 mol) in dry dichloromethane (30 ml) cooled to 0° C. A white complex of N-bromosuccinimide and dimethyl sulphide was precipitated. After the mixture was stirred for 10 min at 0° C., a solution of 2-cyano-3-hydroxy-8-(4-cyano-4'-oxybiphenyl)oct-1-ene (1.3e) (0.0087 mol) was added dropwise. The mixture was then stirred for 24 h at room temperature during which time the solution cleared. The reaction mixture was diluted with petroleum fraction (bp 40°–60° C.) (100 ml) and then poured into ice-water containing sodium chloride (200 ml). The organic phase was separated and washed with saturated brine (100 ml). The aqueous phase was re-extracted with diethyl ether (2×50 ml) and combined extracts plus the organic phase were dried over magnesium sulphate. Removal of solvent in vacuo left a clear oil. Column chromatography using silica gel and an equal mixture of petroleum fraction (bp 40°–60° C.) and dichloromethane gave a clear oil of one-spot purity by t.l.c. Recrystallisation from a 50:50 mixture of diethyl ether: petroleum fraction (b.p 40°–60° C.) gave colourless crystals.

SCHEME 2

PREPARATION OF POLYMERS

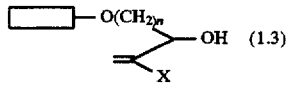

-continued
SCHEME 2

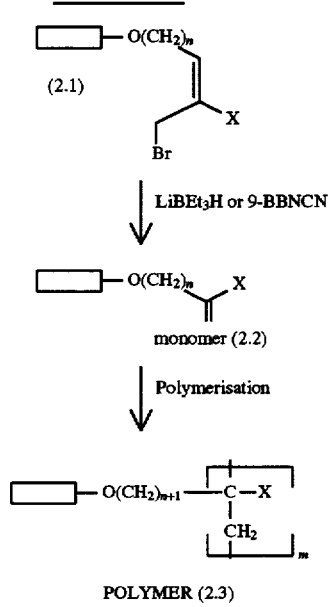

POLYMER (2.3)

Yield=67%. m/z 408, 410 (M⁺), 195. $\upsilon_{max}$ (KBr disc) 2940, 2860, 2220, 1600, 1495, 1255, 1173, 823 cm⁻¹ ¹HNMR (CDCl₃) δ 1.55–1.30 (m, 4H), 1.85 (quin, 2H) 2.45 (q, 2H), 4.0–4.10 (m, 4H), 6.50 (t, complex, 1H), 7.0 (d, 2H), 7.55 (m, 2H), 7.65 (q, 4H).

A similar methodology was employed to synthesise the following compounds.

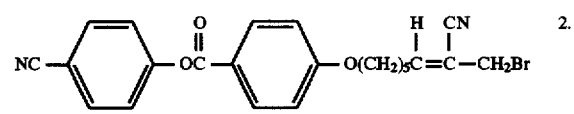 2.1b

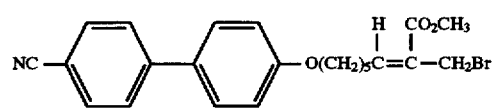 2.1c

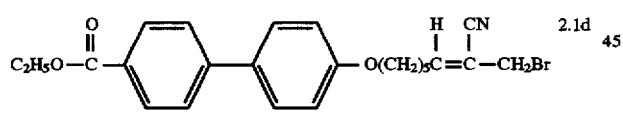 2.1d

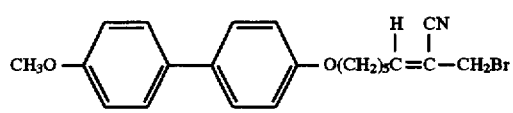 2.1e

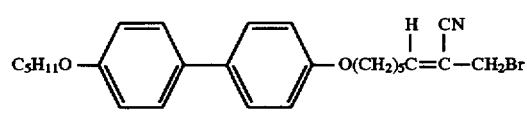 2.1f

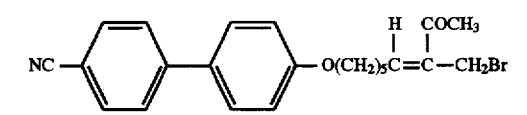 2.1g

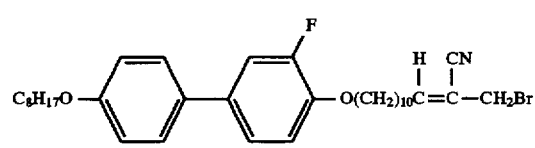 2.1h

-continued

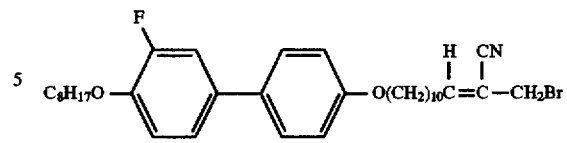 2.1i

Preparation of Compound of Structure (2.3)

This procedure (Ref 3) is exemplified by the synthesis of polymer (2.3a).

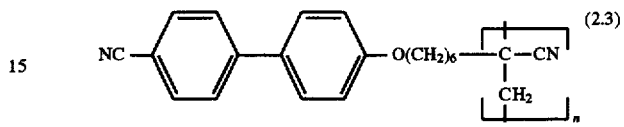 (2.3)

1-Bromo-2-cyano-8-(4-cyano-4'-oxybiphenyl)oct-2-ene (2.1a) (0.0037 mol) was dissolved in sodium-dried tetrahydrofuran (2 ml) and the solution cooled, under an atmosphere of dry nitrogen, to −70° C. Lithium triethylborohydride (1.0M solution in tetrahydrofuran) (0.0039 mol) was added dropwise and the temperature of the solution was allowed to rise to −20° C. when reaction commenced, as indicated by t.l.c. The monomer intermediate (2.2a) could not be isolated under these conditions and t.l.c. showed direct formation of polymer (2.3a). The reaction mixture was added to ice-water (100 ml) and extracted with dichloromethane (2×50 ml) and then dried over magnesium sulphate. Removal of the solvent left a white solid. This was dissolved in dichloromethane (2 ml) and added dropwise to petroleum fraction (bp 40°–60° C.) (50 ml) with vigorous stirring to form a fine suspension. Filtration followed by washing with petroleum fraction (2×50 ml) and drying in air gave a fine white powder (0.65 g).

$\upsilon_{max}$ (KBr disc) 825, 1180, 1250, 1290, 1495, 1605, 2225, 2860, 2940 cm⁻¹. ¹HNMR (CDCl₃) δ 0.85 (q, 2H), 1.20–1.65 (m, 12H), 1.65–1.90 (broad s, 2H), 3.80–4.05 (broad s, 2H), 6.80–7.00 (broad s, 2H), 7.35–7.75 (complex, 6H). ¹³CNMR (CDCl₃) 24.65, 25.95, 29.15, 67.95, 110.20, 115.10, 119.20, 127.15, 128.40, 130.40, 131.45, 132.65, 145.20, 159.75.

$\overline{M}_w$=5360 $\overline{M}_w/\overline{M}_n$=1.6
$\overline{M}_n$=3370
No. repeat units=10
K 58.8 N 104.0° C. I.

Preparation of Compound of Structure (2.2)

This procedure is exemplified by the synthesis of 2-cyano-8-(4-cyano-4'-hexyloxybiphenyl)oct-1-ene (2.2).

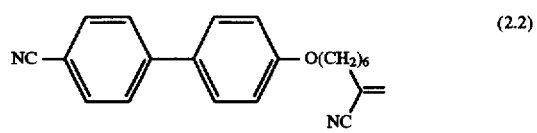 (2.2)

1-Brom-2-cyano-8-(4-cyano-4'-oxybiphenyl)oct-2-ene (2.1a) (0.0052 mol) was dissolved in dry THF (10 ml) at room temperature. Sodium 9-cyano-9-hydrido-9-borabicyclo[3.3.1]nonane (9-BBNCN) [Ref 4] (1.0M solution in the THF) (0.0052 mol) was added with stirring. After 20 min t.l.c. showed complete reaction. The solvent was removed in vacuo and the product was purified by column Chromatography using silica gel with diethyl ether:petroleum fraction (bp 40°–60° C.) (1:1) as eluent.

Yield=52%. ¹HNMR (CDCl₃) δ 1.20–1.50 (m, 8H) 1.80 (quin, 2H), d4.0 (t, 2H), 5.65 (s, ½H), 5.85 (s, ½H), 6.15 (t, ½H), 6.95 (d, 2H), 7.55 (d, 2H), 7.65 (q, 4H). $\upsilon_{max}$ (Thin film) 2925, 2860, 2220, 1600, 1580, 1520, 1490, 1465, 1595, 1290, 1265, 1200, 1180, 985, 820 cm⁻¹. m/z 346, 344 (M⁺), 195.

This gave a mixture of 3 products in about equal quantities including compound (2.2).

SCHEME 3

Preparation of Compounds of Structure (3.2)

An example of this procedure is the synthesis of 2-cyano-3-fluoro-8-(4-cyano-4'-oxybiphenyl)oct-1-ene (3.2a)

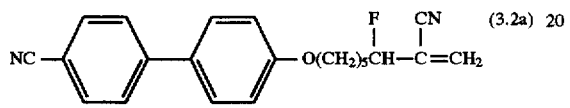

2-Cyano-3-hydroxy-8-(4-cyano-4'-oxybiphenyl)oct-1-ene (1.3a) (0.0058 mol) was dissolved in dry dichloromethane (10 ml) and the solution was cooled to −78° C. Dimethylaminosulphur trifluoride (Methyl-DAST) (0.0069 mol) was added slowly and the mixture stirred for 10 min before being warmed to room temperature. The resultant solution was then added to ice-water (50 ml) and the product extracted into dichloromethane (2×25 ml). The combined extracts were dried over magnesium sulphate and removal of the solvent in vacuo gave a yellow oil which was then purified by column chromatography using silica gel with dichloromethane as the eluent.

Yield=45%. m/z 348 (M⁺), 328 (M⁺−20), 279, 195, 166, 149. $\upsilon_{max}$ (thin film) 2950, 2865, 2230, 1605, 1500, 1255, 1000, 825 cm⁻¹. ¹HNMR (CDCl₃) δ 1.45–1.95 (m, 8H) 4.0 (t, 2H), 4.9–5.1 (m, 1H); 4.8 and 4.95 (2×s, F-H doublet) 6.1 (d, 2h), 6.95 (d, 2H), 7.55–7.70 (m, 6H).

A similar procedure was used to synthesise the following compound

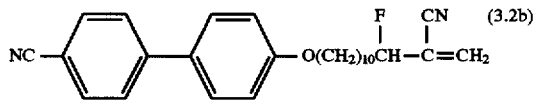

SCHEME 3
THE NEW APPROACH
USING THE —OH GROUP OF THE ADDUCT (1.3)

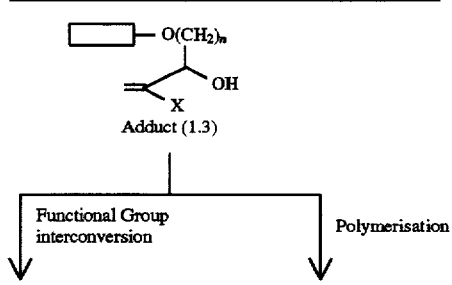

-continued
SCHEME 3
THE NEW APPROACH
USING THE —OH GROUP OF THE ADDUCT (1.3)

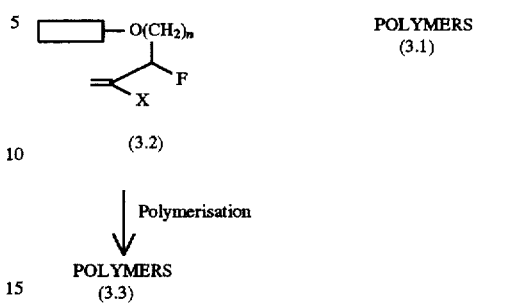

Preparation of Polymers of Structure (3.1 and 3.3)

An example of this procedure is the synthesis of polymer (3.1a).

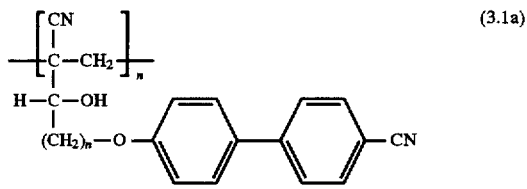

2-Cyano-3-hydroxy-8-(4-cyano-4'-oxybiphenyl)oct-1-ene (1.3a) (0.0044 mol) and photoinitiator (Irgacure 184) (2 mol %) (0.09 mmol) were dissolved in dry dichloromethane (5 ml) and the resultant solution evenly distributed over the inner surface of a 15 cm diameter Petri dish. Evaporation of solvent left a thin film of monomer and photoinitiator which was then exposed to sunlight or a sunlamp for 6 hours. After this time, t.l.c. showed approximately 50% polymer formation and this proportion did not increase on further exposure to sunlight. The monomer/polymer mixture was suspended in dry methanol and centrifuged for 30 min at 5×10³ rpm. The supernatant liquid containing mostly monomer was removed and the white precipitate dissolved in dichloromethane (2 ml) and suspended in petroleum fraction (bp 40°–60° C.). The resultant fine precipitate was removed by filtration and dried in air to leave a fine white powder of the polymer (350 mg).

$\upsilon_{max}$ (KCl disc) 3700–3100, 2220, 1600, 1490, 1290, 1250, 1180, 820 cm⁻¹. ¹HNMR (CDCl₃) 1.35–1.65 (m, 10H), 1.80 (s, 2H), 3.95 (s, 2H), 6.90 (s, 2H), 7.55 (s, 2H), 7.60 (s, 6H).

$\overline{M}_w$=3798 $\overline{M}_w/\overline{M}_n$=1.24

$\overline{M}_n$=3060

A number of other monomers have been polymerised using this procedure to produce the following polymers.

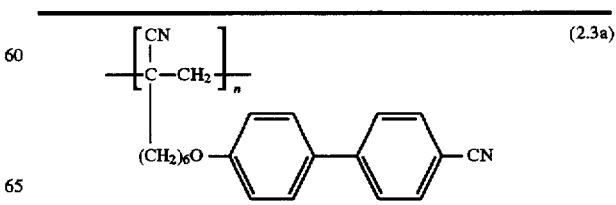

-continued

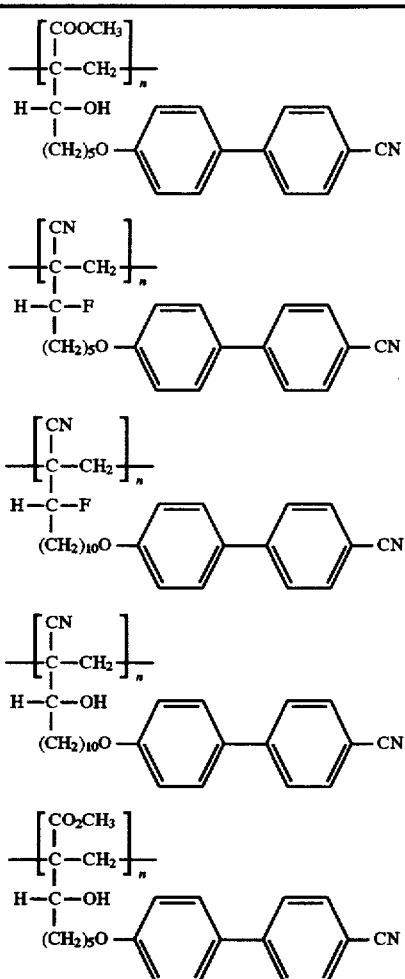

| TRANSITION TEMPERATURES/°C. Compound No | |
|---|---|
| (2.3a) | K 40.0 N 64.0 I |
| (3.3a) | K 47.0 N 96.0 I |
| (3.1b) | K 25.5 S$_A$ 99.0 I |
| (3.1d) | K 42.0 N 73.0 I |
| (3.3b) | K 30.0 S$_A$ 96.0 I |
| (3.1c) | K 50.0 S$_A$ 71.0 I |

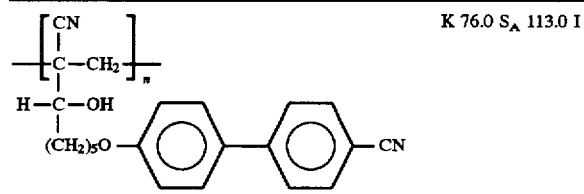

| | Transition Temperatures/°C. |
|---|---|
| | K 76.0 S$_A$ 113.0 I |

-continued

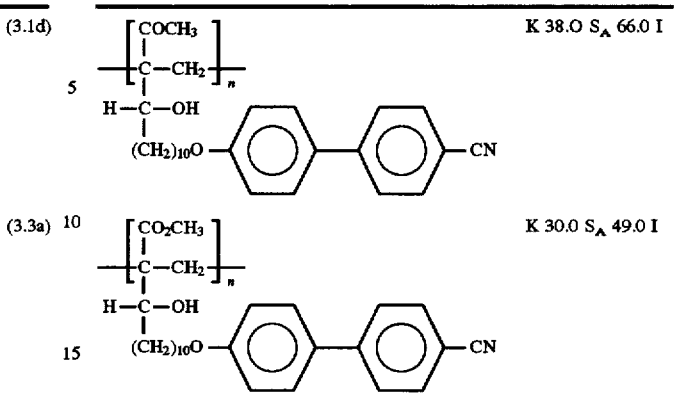

The following polymers were also synthesised and the subsequent data obtained:

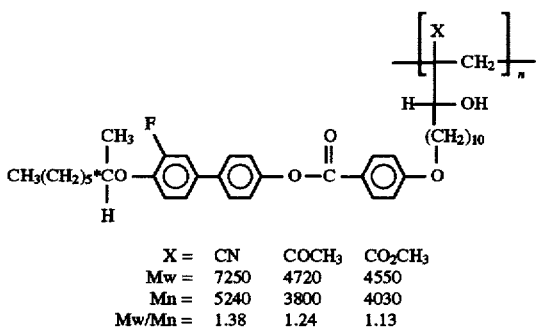

| X = | CN | COCH$_3$ | CO$_2$CH$_3$ |
|---|---|---|---|
| Mw = | 7250 | 4720 | 4550 |
| Mn = | 5240 | 3800 | 4030 |
| Mw/Mn = | 1.38 | 1.24 | 1.13 |

Transition temperatures/°C.

K 74 Sc* 141 I.  K 2.5 Sc* 55 N* 66.5 I.  K 18 Sc* 90 I.

These compounds were made according to the method depicted in FIG. 1. The reagents used in FIG. 1 are:

(i) R(−)-2-octanol, diethylazodicarboxylate (DEAD), triphenylphosphine
(ii) magnesium, triethylborate
(iii) dihydropyran, p-toluenesulphonic acid
(iv) tetrakis (triphenylphosphine) palladium (o), sodium carbonate, toluene, followed by p-toluenesulphonic acid, dichloromethane
(v) 1-bromo-11-hydroxyhexane, potassium carbonate
(vi) potassium hydroxide, ethanol
(vii) DCC/DMAP
(viii) pyridinium dichromate, sodium acetate, dichloromethane
(ix) acrylonitrile, methyl acrylate or methyl vinyl ketone, 3-quinuclidinol
(x) Irgacure 184, hv where DCC=dicyclohexylcarbodiimide
DMAP=4-N,N-dimethylaminopyridine
Irgacure 184 is a photoinitiator commercially available from Ciba Geigy.

The compounds described by the current invention are useful for a broad range of applications.

Many of the compounds described by Formula A and mixtures including compounds of Formula A show liquid crystalline behaviour and are thus usefully employed in liquid crystal devices. Examples of such devices include optical and electro-optical devices, magneto-optical devices, and devices providing responses to stimuli such as temperature changes and total or partial pressure changes. The compounds of formula I may also be included in a mixture. Where the mixture comprises at least two compounds. Typical mixtures include mixtures consisting of compounds of Formula A, and also mixtures comprising at least one compound of Formula A and at least one compound not of Formula A.

Figure 2:
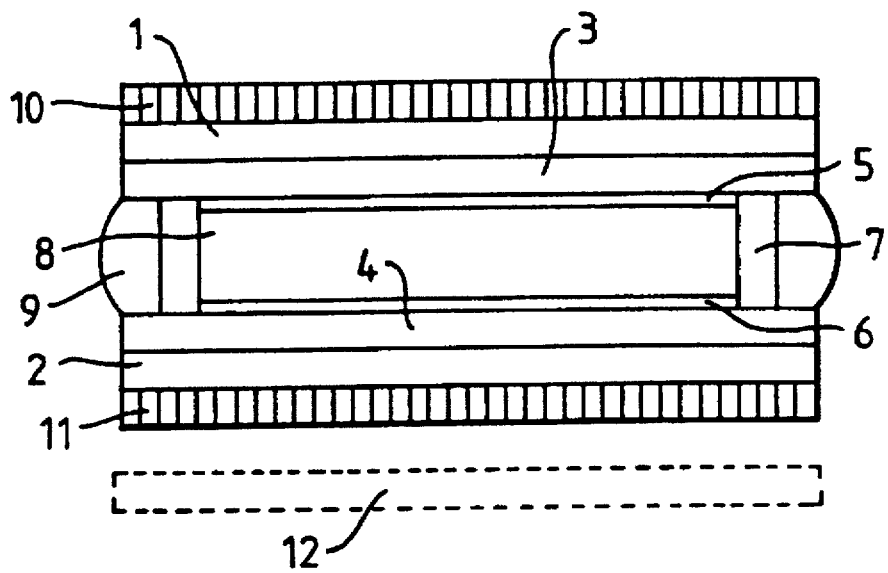
FIG. 2 illustrates a liquid crystal device.

An example of the use of a compound of general structure A in a device embodying the present invention will now be described with reference to FIG. 2.

The liquid crystal device consists of two transparent plates, 1 and 2, in this case made from glass. These plates are coated on their internal face with transparent conducting electrodes 3 and 4. An alignment layer 5,6 is introduced onto the internal faces of the cell so that a planar orientation of the molecules making up the liquid crystalline material will be approximately parallel or at a small angle to the glass plates 1 and 2. For some types of display the alignment directions are orthogonal. The electrodes 3, 4 may be formed into row and column electrodes so that the intersections between each column and row form an x, y matrix of addressable elements or pixels. A spacer 7 eg of polymethyl methacrylate separates the glass plates 1 and 2 to a suitable distance eg 2 microns. Liquid crystal material 8 is introduced between glass plates 1, 2 by filling the space in between them. The spacer 7 is sealed with an adhesive 9 in a vacuum using an existing technique. Polarisers 10, 11 are arranged in front of and behind the cell. For some devices, only one or even no polarisers are required.

In alternative embodiments the substrates with the aligning layers on them are heated and sheared to induce alignment, alternatively the substrates with the aligning layers are thermally annealed above the glass transition temperature and below the liquid crystal to isotropic phase transition in combination with an applied field. Further embodiments may involve a combination of these aligning techniques. With some of these combinations an alignment layer may not be necessary.

The device may operate in a transmissive or reflective mode. In the former, light passing through the device, eg from a tungsten bulb, is selectively transmitted or blocked to form the desired display. In the reflective mode a mirror (12) is placed behind the second polariser 11 to reflect ambient light back through the cell and two polarisers. By making the mirror partly reflecting the device may be operated both in a transmissive and reflective mode.

The alignment layers 5,6 have two functions one to align contacting liquid crystals molecules in a preferred direction and the other to give a tilt to these molecules—a so called surface tilt—of a few degrees typically around 4° or 5°. The alignment layers 5, 6 may be formed by placing a few drops of the polyimide onto the cell wall and spinning the wall until a uniform thickness is obtained. The polyimide is then cured by heating to a predetermined temperature for a predetermined time followed by unidirectional rubbing with a roller coated with a nylon cloth.

In an alternative embodiment a dye material may be incorporated with the material of the device and a single polariser used.

Materials have been proposed for laser addressed applications in which laser beams are used to scan across the surface of the material or leave a written impression thereon. For various reasons, many of these materials have consisted of organic materials which are at least partially transparent in the visible region. The technique relies upon localised absorption of laser energy which causes localised heating and in turn alters the optical properties of the otherwise transparent material in the region of contact with the laser beam. Thus as the beam traverses the material, a written impression of its path is left behind. One of the most important of these applications is in laser addressed optical storage devices, and in laser addressed protection displays in which light is directed through a cell containing the material and is projected onto a screen. Such devices have been described by Khan Appl. Phys. Lett. Vol. 22, p 111, 1973; and by Harold and Steele in Proceedings of Euro display 84, pages 29–31, September 1984, Paris, France, in which the material in the device was a smectic liquid crystal material. Devices which use a liquid crystal material as the optical storage medium are an important class of such devices. The use of semiconductor lasers, especially $Ga_xAl_{1-x}As$ lasers where x is from 0 to 1, and is preferably 1, has proven popular in the above applications because they can provide laser energy at a range of wavelengths in the near infra-red which cannot be seen and thus cannot interfere with the visual display, and yet can provide a useful source of well-defined, intense heat energy. Gallium arsenide lasers provide laser light at wavelengths of about 850 nm, and are useful for the above applications. With increasing Al content (x<1), the laser Wavelength may be reduced down to about 750 nm. The storage density can be increased by using a laser of shorter wavelength.

The compounds of the present invention may be suitable as optical storage media and may be combined with dyes for use in laser addressed systems, for example in optical recording media.

The smectic and/or nematic properties of the materials described by the current invention may be exploited.

For example the materials of the current invention may be used to produce ferroelectric mixtures and devices.

The compounds of the present invention may also be used in pyroelectric devices for example detectors, steering arrays and vidicon cameras.

Figure 3:
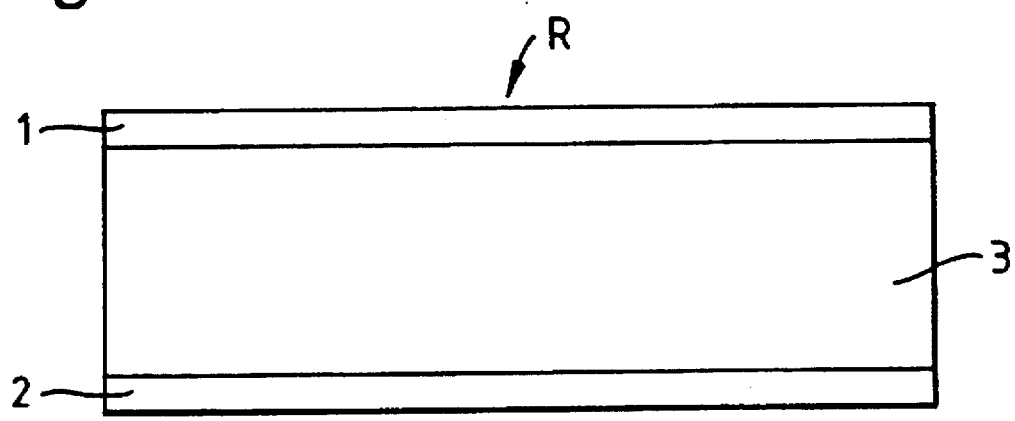
FIG. 3 illustrates a pyroelectric device.

FIG. 3 illustrates a simple pyroelectric detector in which the materials of the current invention may be incorporated:

A pyroelectric detector consists of electrode plates 1,2 at least one of which may be pixellated. In operation the detector is exposed to radiation R, for example infrared radiation, which is absorbed by the electrode 1. This results in a rise in temperature which is transmitted to a layer of pyroelectric material 3 by conduction. The change in temperature results in a thermal expansion and a charge is generated. This change in charge is usually small when compared with the charge ouput due to the change in the spontaneous polarisation, Ps with a change in temperature; this constitutes the primary pyroelectric effect. A change in charge results in a change in potential difference between the electrodes. The charge on each pixel may be read out and the resulting signal is used to modulate scanning circuits in, for example, a video monitor and for a visual image of the infrared scans.

REFERENCES

1. J Mancuso, D. Swern, Synthesis, 165;185 (1981).
2. A B Baylis and M E D Hillman, German Patent 2155113, 1972; Chem Abs 77, 34174q (1972).
3. H M R Hoffman, J Rabe, J. Organ. Chem. 3849–3859 (1985).
4. R O Hutchins, J. Org. Chem., 42, 82–91 (1977).

We claim:

1. A liquid crystal polymer or copolymer of structure (A):

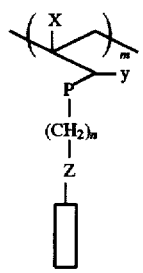 (A)

wherein X is selected from the group consisting of CN, COR, $CO_2R$, CHO and $CF_3$;

R is selected from the group consisting of a branched chain, straight chain or chiral $C_{1-10}$ alkyl;

▢ = a mesogenic group;

Z is selected from the group consisting of a single covalent bond, oxygen, sulfur, $CO_2$ and OCO;

n is 1 to 20;

Y is selected from the group consisting of H, OH, F and $OCH_3$;

m is 3 to 200; and

P is selected from the group consisting of a single covalent bond, oxygen and OCO.

2. A liquid crystal polymer or copolymer according to claim 1, wherein the mesogenic group is defined from structure (B):

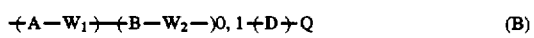 (B)

wherein A, B and D are independently selected from the group consisting of:

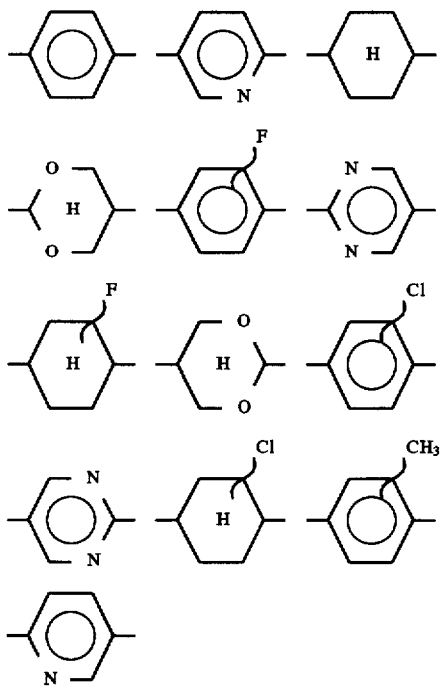

$W_1$ and $W_2$ are independently selected from the group consisting of a single covalent bond, COO, OCO, $CH_2CH_2$, $CH_2O$, $OCH_2$ and 0;

Q is selected from the group consisting of CN, halogen, R, OR, COOR, OOCR, $CF_3$, lactate derivatives where R is a chiral/straight or branched chain $C_{1-10}$ alkyl, and including where one or more $CH_2$ groups are optionally substituted by CH(CN), $CH(CF_3)$, CH(Cl), $CH(CH_3)$, where if more than one $CH_2$ group is substituted then such substitution is not carried out on neighboring $CH_2$ groups.

3. A liquid crystal polymer or copolymer according to claim 1, wherein Y is OH.

4. A liquid crystal polymer or copolymer according to claim 3 wherein the OH groups are used as a point of attachment for cross-linking agents to form elastomers.

5. A liquid crystal polymer or copolymer according to claim 1 comprising monomers of structure (C):

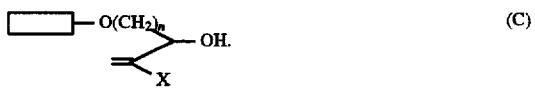 (C)

6. A liquid crystal polymer or copolymer according to claim 5 wherein X=CN, COR, $CO_2R$, CHO, $CF_3$; R=branched chain, straight chain or chiral alkyl and n=1 to 20.

7. A liquid crystal polymer or copolymer according to claim 5 wherein the monomer comprises any one of compounds 1.3a to 1.3m:

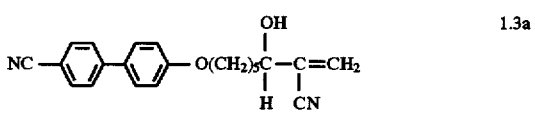 1.3a

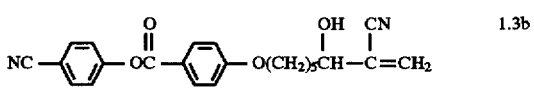 1.3b

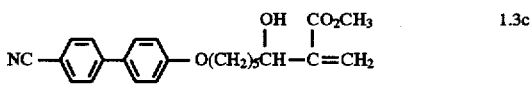 1.3c

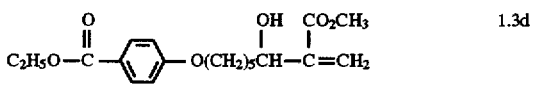 1.3d

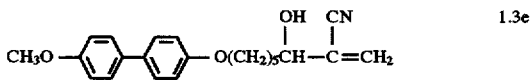 1.3e

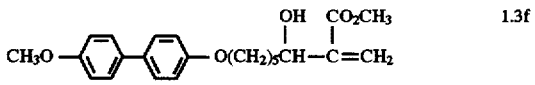 1.3f

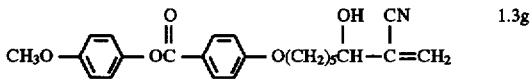 1.3g

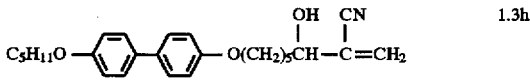 1.3h

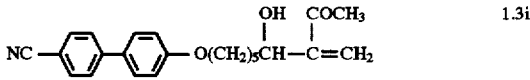 1.3i

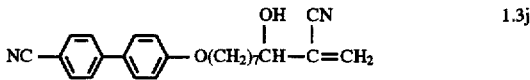 1.3j

-continued

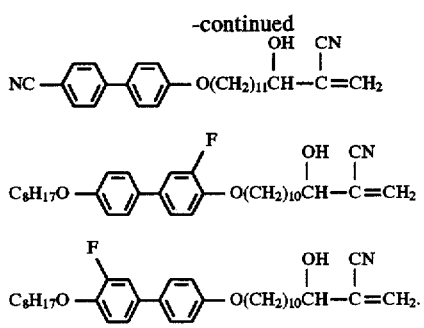

8. A liquid crystal polymer or copolymer according to claim 1, wherein the polymer or copolymer comprises the general structure (D):

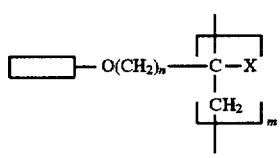

wherein

X=CN, COR, CO₂R, CHO or CF₃;

R=branched chain, straight chain or chiral alkyl;

☐=any suitable mesogenic group;

n=1 to 20;

m=3 to 200.

9. A liquid crystal polymer or copolymer according to claim 8 comprising

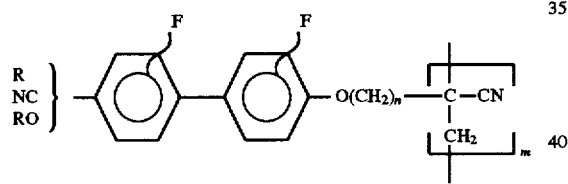

m=3 to 200;

R=branched chain, straight chain or chiral alkyl.

10. A liquid crystal polymer or copolymer according to claim 3, wherein the polymer comprises the structure (F):

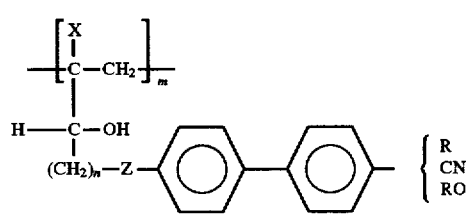

wherein

X=CN, COR, CO₂R, CHO, CF₃;

R=branched, straight or chiral alkyl;

z=a single covalent bend, oxygen, sulphur, CO₂ or OCO;

n=1 to 20;

m=3 to 200.

11. A liquid crystal polymer or copolymer according to claim 10 comprising

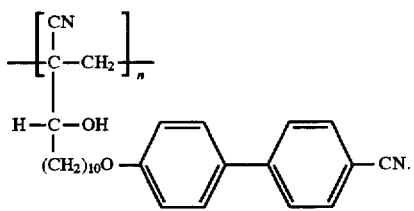

12. A liquid crystal polymer or copolymer according to claim 10 comprising

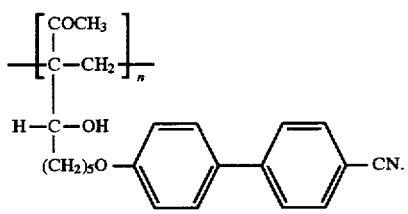

13. A liquid crystal polymer or copolymer according to claim 10 comprising

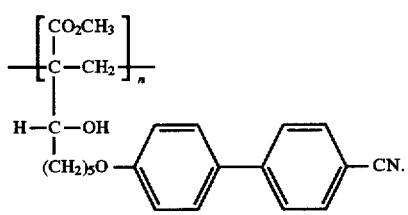

14. A liquid crystal polymer or copolymer according to claim 1 comprising monomers of structure (G):

wherein

X=CN, COR, CO₂R, CHO, CF₃;

R=branched chain, straight chain or chiral alkyl;

☐=any suitable mesogenic group; and n=1 to 20.

15. A liquid crystal polymer or copolymer according to claim 14 comprising

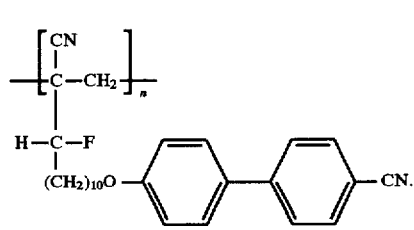

16. A liquid crystal polymer or copolymer according to claim 14 comprising

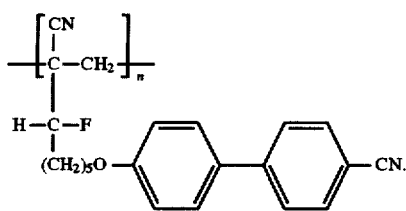

17. A liquid crystal polymer or copolymer according to claim 1 comprising

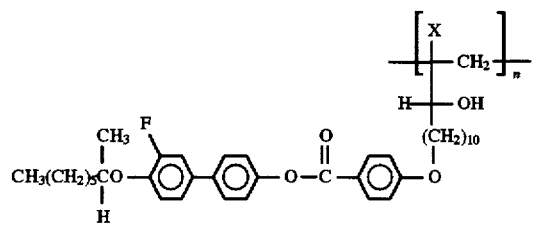

wherein X is CN, COCH$_3$ or CO$_2$CH$_3$ and n is 3–200.

18. A liquid crystal material having optically active properties and containing at least one liquid crystal polymer or copolymer as claimed in claim 1.

19. A liquid crystal material according to claim 18 wherein the material is a ferroelectric liquid crystal material.

20. A liquid crystal electro-optical display device characterised in that it incorporates the material as claimed in claim 18.

21. A device comprising two spaced cell walls each bearing electrode structures and treated on at least one facing surface with an alignment layer, a layer of a liquid crystal material enclosed between the cell walls, characterised in that it incorporates the liquid crystal material as claimed in claim 18.

22. A pyroelectric device comprising two spaced electrodes and a layer of a liquid crystal material enclosed between the electrodes, characterised in that it incorporates the liquid crystal material as claimed in claim 18.

23. An optical recording medium comprising a recording layer which comprises one or more compounds of claim 1 and a dye material.

24. A method of producing monomer units, not themselves liquid crystalline, which polymerise to form liquid crystal polymer materials as claimed in claim 1 using the Bayliss-Hillman reaction.

* * * * *